United States Patent

Lauk

Patent Number: 5,554,734
Date of Patent: Sep. 10, 1996

[54] AZO DYES CONTAINING A BRIDGE MEMBER BASED ON STIBENE AND MORPHOLINO-SUBSTITUTED TRIAZINE

[75] Inventor: Urs Lauk, Zürich, Switzerland

[73] Assignee: Ciba-Geigy Corporation, Tarrytown, N.Y.

[21] Appl. No.: 460,176

[22] Filed: Jun. 2, 1995

[30] Foreign Application Priority Data

Jun. 20, 1994 [CH] Switzerland ............ 1950/94

[51] Int. Cl.⁶ .................... C09B 56/04
[52] U.S. Cl. .................... 534/691; 534/631
[58] Field of Search .................... 534/691, 631

[56] References Cited

U.S. PATENT DOCUMENTS

| 2,459,435 | 1/1949 | Keller et al. ............ 534/691 |
| 4,997,919 | 3/1991 | Schaulin ............ 534/637 |
| 5,320,648 | 6/1994 | McMullan et al. ............ 8/639 |
| 5,324,330 | 6/1994 | Schaulin et al. ............ 8/639 |
| 5,328,995 | 7/1994 | Schaulin et al. ............ 534/797 |

FOREIGN PATENT DOCUMENTS

| 472957 | 4/1951 | Canada ............ 534/691 |
| 0548014 | 6/1993 | European Pat. Off. . |
| 0853324 | 10/1952 | Germany . |
| 616523 | 1/1949 | United Kingdom ............ 534/691 |

OTHER PUBLICATIONS

Fujita et al., *Chemical Abstracts*, 56:4905h (1962).

Primary Examiner—Fiona T. Powers
Attorney, Agent, or Firm—Kevin T. Mansfield

[57] ABSTRACT

Azo dyes of formula

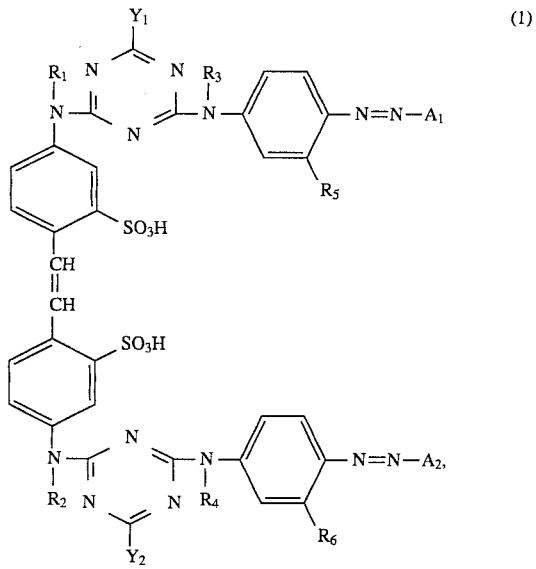

wherein $R_1$, $R_2$, $R_3$ and $R_4$ are each independently of one another hydrogen or unsubstituted or substituted $C_1$–$C_4$alkyl, $R_5$ and $R_6$ are each independently of the other hydrogen, halogen, or unsubstituted or hydroxy-substituted $C_1$–$C_4$alkyl or $C_1$–$C_4$alkoxy; $C_2$–$C_4$alkanoylamino which is unsubstituted or substituted in the alkyl moiety by hydroxy or $C_1$–$C_4$alkoxy, or ureido which is unsubstituted or substituted in the amino end group by one or two $C_1$–$C_4$alkyl groups, $Y_1$ and $Y_2$ are each independently of the other amino, N-mono- or N,N-di-$C_1$–$C_4$alkylamino which is unsubstituted or substituted in the alkyl moiety by hydroxy, sulfo, carboxy or $C_1$–$C_4$alkoxy; $C_5$–$C_7$cycloalkylamino which is unsubstituted or substituted in the. cycloalkyl ring by $C_1$–$C_4$alkyl; phenylamino or N-$C_1$–$C_4$alkyl-N-phenylamino which are each unsubstituted or substituted in the phenyl ring by $C_1$–$C_4$alkyl, $C_1$–$C_4$alkoxy, carboxy, sulfo or halogen; or morpholino or piperidin-1-yl, and $A_1$ and $A_2$ are each independently of the other unsubstituted or substituted phenyl or naphthyl, are direct dyes for different substrates, especially cellulosic fibre materials. They are high-temperature stable and are therefore particularly suitable for dyeing polyester/cotton blends with a disperse dye for the polyester fibres under the conditions for dyeing polyester fibres in a single-step, one-bath process.

5 Claims, No Drawings

AZO DYES CONTAINING A BRIDGE MEMBER BASED ON STIBENE AND MORPHOLINO-SUBSTITUTED TRIAZINE

The present invention relates to novel azo dyes, to a process for their preparation and to the use thereof for dyeing and printing fibre materials, in particular textile fibre materials.

It is the object of this invention to provide dyes which are suitable for dyeing nitrogen-containing and hydroxyl-group containing fibre materials, especially cellulosic fibre materials, and which have good fastness properties and are high-temperature stable.

It has been found that the azo dyes of formula (1) meet these requirements. Accordingly, the invention relates to azo dyes of formula

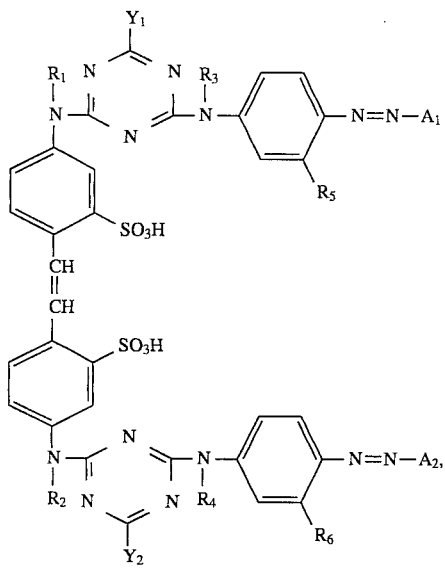

(1)

wherein $R_1$, $R_2$, $R_3$ and $R_4$ are each independently of one another hydrogen or unsubstituted or substituted $C_1$–$C_4$alkyl, $R_5$ and $R_6$ are each independently of the other hydrogen, halogen, or unsubstituted or hydroxy-substituted $C_1$–$C_4$alkyl or $C_1$–$C_4$alkoxy; $C_2$-$C_4$alkanoylamino which is unsubstituted or substituted in the alkyl moiety by hydroxy or $C_1$–$C_4$alkoxy, or ureido which is unsubstituted or substituted in the amino end group by one or two $C_1$–$C_4$alkyl groups, $Y_1$ and $Y_2$ are each independently of the other amino, N-mono- or N,N-di-$C_1$–$C_4$alkylamino which is unsubstituted or substituted in the alkyl moiety by hydroxy, sulfo, carboxy or $C_1$–$C_4$alkoxy; $C_5$-$C_7$cycloalkylamino which is unsubstituted or substituted in the cycloalkyl ring by $C_1$–$C_4$alkyl; phenylamino or N—$C_1$–$C_4$alkyl-N-phenylamino which are each unsubstituted or substituted in the phenyl ring by $C_1$–$C_4$alkyl, $C_1$–$C_4$alkoxy, carboxy, sulfo or halogen; or morpholino or piperidin-1-yl, and $A_1$ and $A_2$ are each independently of the other unsubstituted or substituted phenyl or naphthyl.

$R_1$, $R_2$, $R_3$, $R_4$, $R_5$ and $R_6$ defined as $C_1$–$C_4$alkyl are methyl, ethyl, propyl, isopropyl, sec-butyl, tert-butyl or isobutyl, in particular methyl or ethyl and, preferably, methyl. Possible substituents of $R_1$, $R_2$, $R_3$ and $R4$ in the significance of $C_1$–$C_4$alkyl may be hydroxy, $C_1$–$C_4$alkoxy, halogen or sulfato. $R_5$ and $R_6$ defined as $C_1$–$C_4$alkyl may be further substituted by hydroxy.

The term sulfo broadly comprises the free acid form (-$SO_3$H) as well as the salt form. Alkali metal salts (Li, Na, K) or ammonium salts are particularly suitable.

$R_5$ and $R_6$ defined as $C_1$–$C_4$alkoxy are typically methoxy, ethoxy, propoxy, isopropoxy, butoxy or isobutoxy, preferably methoxy. $R_5$ and $R_6$ in the significance of $C_1$–$C_4$alkoxy may be further substituted by hydroxy.

$R_5$ and $R_6$ defined as halogen are typically fluoro or chloro. Chloro is preferred.

$R_5$ and $R_6$ defined as $C_2$-$C_4$alkanoylamino may suitably be the unsubstituted radicals as well as those that are substituted in the alkyl moiety by hydroxy or $C_1$–$C_4$alkoxy. The unsubstituted radicals are preferred, typically acetylamino or propionylamino. Typical examples of substituted radicals are —NH—CO—$CH_2$—OH and —NH—CO—$CH_2$—$OCH_3$.

$R_5$ and $R_6$ defined as ureido which is unsubstituted or substituted in the amino end group by one or two $C_1$–$C_4$alkyl groups are suitably —NH—CO—$NH_2$, NH—CO—NH—$CH_3$ and NH—CO—N($CH_3$)$_2$.

$Y_1$ and $Y_2$ defined as N-mono- or N,N-di-$C_1$–$C_4$alkylamino may suitably comprise the unsubstituted radicals as well as those that are substituted in the alkyl moiety by hydroxy, sulfo, carboxy or $C_1$–$C_4$alkoxy. The radicals which are unsubstituted in the alkyl moiety and, in particular, those that are substituted in the alkyl moiety by hydroxy, are preferred. Typical examples are N-β-hydroxyethylamino and N,N-di-β-hydroxyethylamino.

$Y_1$ and $Y_2$ defined as $C_5$-$C_7$cycloalkylamino may comprise the unsubstituted radicals as well as those that are substituted in the cycloalkyl ring by $C_1$–$C_4$alkyl, e.g. methyl or ethyl, preferably methyl. Preferred radicals of this kind are the corresponding cyclohexyl radicals.

$Y_1$ and $Y_2$ defined as phenylamino or N-$C_1$–$C_4$alkyl-N-phenylamino is preferably phenylamino. These radicals are preferably unsubstituted in the phenyl ring.

$A_1$ and $A_2$ in the significance of phenyl or naphthyl may be unsubstituted or substituted by $C_1$–$C_4$alkyl, $C_1$–$C_4$alkoxy, $C_2$-$C_4$alkanoylamino, ureido, halogen, carboxy or sulfo. The sulfo-substituted radicals are of particular importance.

$R_1$, $R_2$, $R_3$ and $R_4$ are preferably hydrogen or $C_1$–$C_4$alkyl. Hydrogen is particularly preferred.

$R_5$ and $R_6$ are preferably each independently of the other $C_2$-$C_4$alkanoylamino which is unsubstituted or substituted in the alkyl moiety by hydroxy or $C_1$–$C_4$alkoxy, or ureido which is unsubstituted or substituted in the amino end group by one or two $C_1$–$C_4$alkyl groups.

Particularly preferred meanings of $R_5$ and $R_6$ are $C_2$-$C_4$alkanoylamino or ureido, more particularly $C_2$-$C_4$alkanoylamino and, preferably, acetylamino.

$A_1$ and $A_2$ are preferably each independently of the other phenyl or phenyl which is substituted by $C_1$–$C_4$alkyl, $C_1$–$C_4$alkoxy, $C_2$-$C_4$alkanoylamino, ureido, halogen, carboxy or sulfo; or naphthyl or sulfo-substituted naphthyl; in particular phenyl or phenyl which is substituted by $C_1$–$C_4$alkyl, $C_1$–$C_4$alkoxy, $C_2$-$C_4$alkanoylamino, ureido, halogen, carboxy or sulfo; and, preferably, sulfo-substituted phenyl.

$A_1$ and $A_2$ preferably have identical meanings.

$Y_1$ and $Y_2$ are preferably each independently of the other amino, N-mono- or N,N-di-$C_1$–$C_4$alkylamino which are each unsubstituted or substituted in the alkyl moiety by hydroxy, cyclohexylamino, phenylamino, morpholino or piperidin-1-yl.

Particularly preferred meanings of $Y_1$ and $Y_2$, each independently of the other, are N-mono- or N,N-di- $C_1$–$C_4$alkylamino which are each unsubstituted or substituted in the alkyl moiety by hydroxy; or morpholino. More particularly, $Y_1$ and $Y_2$ are N-β-hydroxyethylamino, N,N-di-β-hydroxyethylamino or morpholino. Morpholino is preferred.

$Y_1$ and $Y_2$ preferably have identical meanings.

Preferred azo dyes of formula (1) are those wherein $R_1$, $R_2$, $R_3$ and $R_4$ are hydrogen, $R_5$ and $R_6$ are each independently of the other $C_2$-$C_4$alkanoylamino which is unsubstituted or substituted in the alkyl moiety by hydroxy or $C_1$–$C_4$alkoxy or ureido which is substituted in the amino end group by one or two $C_1$–$C_4$alkyl groups; $Y_1$ and $Y_2$ are each independently of the other amino, N-mono- or N,N-di-$C_1$–$C_4$alkylamino which are each unsubstituted or substituted in the alkyl moiety by hydroxy; cyclohexylamino, phenylamino, morpholino or piperidin-1-yl; and $A_1$ and $A_2$ are each independently of the other phenyl or phenyl which is substituted by $C_1$–$C_4$alkyl, $C_1$–$C_4$alkoxy, $C_2$–$C_4$alkanoylamino, ureido, halogen, carboxy or sulfo; or naphthyl or sulfo-substituted naphthyl. The substitutents $A_1$ and $A_2$ and $Y_1$ and $Y_2$ preferably each have identical meanings.

Particularly preferred azo dyes of formula (1) are those wherein $R_1$, $R_2$, $R_3$ and $R_4$ are hydrogen, $R_5$ and $R_6$ are each independently of the other $C_2$-$C_4$alkanoylamino or ureido; $Y_1$ and $Y_2$ are each independently of the other N-mono- or N,N-di-$C_1$–$C_4$alkylamino which are each unsubstituted or substituted in the alkyl moiety by hydroxy; cyclohexylamino, phenylamino, morpholino or piperidin-1-yl; and $A_1$ and $A_2$ are each independently of the other sulfo-substituted naphthyl or, preferably, sulfo-substituted phenyl. The substitutents $A_1$ and $A_2$ and $Y_1$ and Y2 preferably each have identical meanings.

Very particularly preferred azo dyes of formula (1) are those wherein $R_5$ and $R_6$ are $C_2$-$C_4$alkanoylamino, $Y_1$ and Y2 are morpholino and $A_1$ and $A_2$ are sulfo-substituted phenyl. The substitutents $A_1$ and $A_2$ preferably each have identical meanings.

The invention further relates to a process for the preparation of the azo dyes of formula (1), which comprises a) reacting, independently of each other, a compound of formula

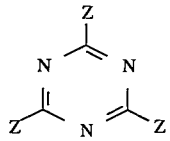

with a compound of formula

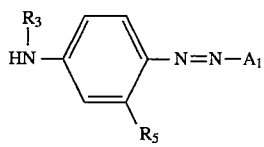

to give the compound of formula

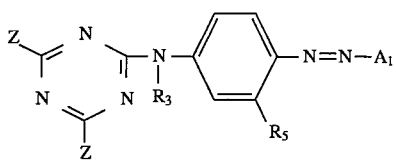

and reacting a further compound of formula (2) with a compound of formula

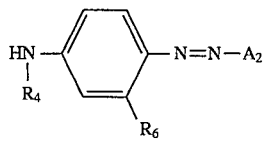

to give the compound of formula

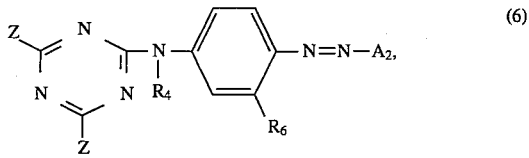

b) reacting a compound of formula

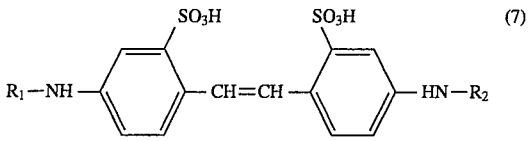

in succession, and in any order, with the compounds of formulae (4) and (6) obtainable in accordance with a), and c) reacting the compound of formula

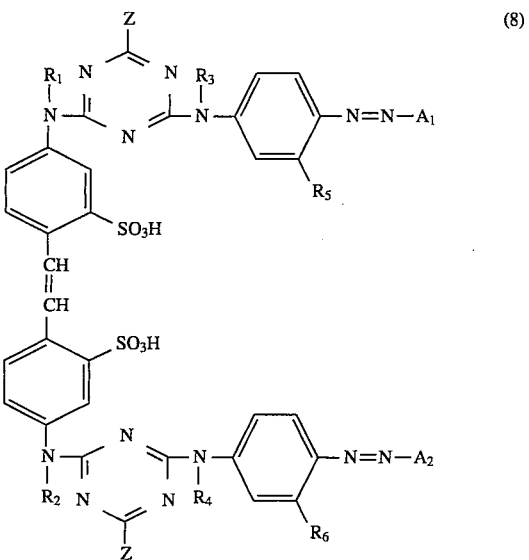

obtainable in accordance with b), with at least one of the compounds of formulae

and

in which formulae above $R_1$, $R_2$, $R_3$, $R_4$, $R_5$, $R_6$, $Y_1$, $Y_2$, $A_1$ and $A_2$ are each as defined in connection with formula (1), and Z is halogen, preferably chloro.

It is preferred to react the trihalotriazine of formula (2) initially with about stoichiometric amounts of an aminoazo compound of formula (3) or formula (5), in the temperature range from typically −5° to 20° C., preferably from 0° to 5° C., while keeping the pH in the neutral to acid range, preferably from 2 to 7, more particularly from 3 to 5, by the addition of a suitable base, e.g. an alkali metal base such as a hydroxide, carbonate or hydrogencarbonate of lithium, sodium or potassium. The aminoazo compound of formula (3) or of formula (5) is conveniently used in about stoichiometric amounts.

The reaction of the compound of formula (7) in succession with the compounds of formulae (4) and (6) obtainable in accordance with a) is preferably carried out in the temperature range from typically 10° to 50° C., more particularly from 20° to 40° C., and in the neutral to acid pH range, e.g. from 3 to 7, preferably from 4 to 6, the compounds of formulae (4), (6) and (7) being conveniently used in about stoichiometric amounts. If the compounds of formulae (3) and (5) are identical aminoazo compounds, then it is advantageous to prepare first 2 molar equivalents of the compound of formula (4) and subsequently to react them with c. 1 molar equivalent of compound of formula (7).

The triazinyl dyes of formula (8) obtainable by the above described process will still contain halogen atoms Z, which can be converted into a group $Y_1$ or $Y_2$ by reaction with at least one compound of formulae (9) and (10), at elevated temperature, preferably 70°–100° C., and in a neutral to slightly alkaline pH range of e.g. 7–12, preferably 8–12, depending on the compound of formula (9) or (10) employed.

The substituents R1, $R_2$, $R_3$, $R_4$, $R_5$, $R_6$, $Y_1$, $Y_2$, $A_1$ and $A_2$ of the compound used in the above process have the meanings and preferred meanings given hereinabove.

The compounds of formulae (2), (3), (5), (7), (9) and (10) are known or can be obtained by methods analogous to those for obtaining known compounds.

The compounds of formulae (3) and (5) can be obtained in known manner by diazotising and coupling suitable starting compounds. Diazotisation is carried out in per se known manner with a nitrite, typically an alkali metal nitrite such as sodium nitrite, in a medium containing mineral acid, conveniently hydrochloric acid, in the temperature range from −5° to 40° C., preferably from −5° to 10° C. Coupling is carried out in per se known manner in the acid, neutral or weakly alkaline pH range and in the temperature range from 0° to 30° C.

The azo dyes of formula (1) are obtained either in the form of the free acid or, preferably, in the form of the salts thereof.

Suitable salts are typically the alkali metal, alkaline earth metal or ammoniuim salts or the salts of an organic amine. Illustrative examples are the sodium, lithium, potassium or ammonium salts or the salts of mono-, di- or triethanolamine.

A further object of the invention is the use of the azo dyes of formula (1) for dyeing and printing nitrogen-containing and, preferably, hydroxyl group-containing, fibre materials The novel azo dyes of formula (1) for are thus suitable for dyeing and printing nitrogen-containing or, preferably, cellulosic, fibre materials, preferably textile fibre materials of silk, wool or synthetic polyamides, as well as preferably fibre material made from cellulosic fibres such as rayon, cotton or hemp.

With respect to their tinctorial properties, the novel azo dyes of formula (1) may be termed direct dyes (C.I. direct dyes).

It is also possible to dye textile fibre materials made from fibre blends, typically wool/cotton, polyamide/cotton or, preferably, polyester/cotton blends by one-bath dyeing processes and in the presence of dyes suitable for dyeing each of the other types of fibre.

The textile fibre materials may be in any form of presentation, conveniently as fibres, yarns, woven or knitted goods.

Besides the textile substrates, leather and paper can also be dyed with the novel azo dyes of formula (1).

Level dyeings in yellow shades of good allround fastness properties are obtained, especially good fastness to rubbing, wet treatments, wet rubbing, persipiration and light. If necessary, the wetfastness properties, in particular the washfastness, of the resultant direct dyeings and prints can be substantially enhanced by an aftertreatment with fixing agents.

The novel azo dyes of formula (1) can be readily combined with other dyes, especially with disperse dyes. They have a sufficient high-temperature stability and can thus be used for dyeing under the dyeing conditions for polyester fibres, i.e. in the temperature range from c. 100° to 150° C., preferably from 110° to 130° C., from aqueous liquor and in the pH range from 4 to 7.5, preferably from 5 to 7.

It is therefore possible to use standard disperse dyes together with the dyes of formula (1) in a single step, one-bath process for dyeing polyester/cotton blends in which both fibre components are dyed uniformly in a fast shade by the respective dye. When using a disperse dye having the same shade as the inventive dye it is also possible to obtain solid shade dyeings.

With the novel dyes of formula (1) it is possible to simplify substantially the dyeing of textile blends, e.g. those of polyester and cellulosic fibres. The standard dyeing of each type of fibre of a blend in a separate step using different dyeing conditions is thus no longer necessary.

The following Examples will serve to illustrate the invention. Parts and percentages are by weight, unless otherwise indicated. The relationship between parts by weight and parts by volume is the same as that between the kilogram and the liter.

EXAMPLE 1

173 parts of 3-aminobenzenesulfonic acid are stirred in 500 parts of a mixture of water and ice and 128 parts of concentrated hydrochloric acid. Then a solution of 70.5 parts of sodium nitrite in 200 parts of water are added dropwise over 30 minutes at a temperature of c. 0° C. After the diazotation, excess nitrite is destroyed with sulfamic acid.

For coupling, 186.6 parts of 3-aminoacetanilide as hydrochloride are dissolved in 400 parts of water and to the solution are added c. 145 parts of a 30% aqueous solution of sodium hydroxide. The suspension of the diazo compound obtained as described above is added dropwise to this solution and the pH is kept at 4.8 by the addition of an aqueous solution of sodium hydroxide. When the coupling is complete, the dye is salted out with 290 parts of sodium chloride and isolated by filtration and dried, affording 370 parts of a crude product in the form of the free acid of the compound of formula

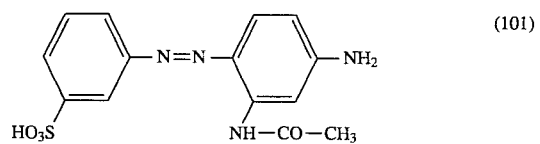
(101)

EXAMPLE 2

19.4 parts of cyanuric chloride are stirred with 100 parts of ice/water and 100 parts of ice. A solution of 33.4 parts of the compound of formula (101) according to Example 1 in 750 parts of water are added dropwise to the resultant cyanuric chloride suspension over 60 minutes at a temperature of 0° to 2° C. and at a pH of 3.5–4. The pH is kept at 3.5–4 by the dropwise addition of a 1N aqueous sodium hydroxide solution. When the dropwise addition is complete, the mixture is allowed to react for c. 2.5 hours. The consumption of 1N aqueous sodium hydroxide solution is c. 110 parts. The reaction solution so obtained contains the compound of formula

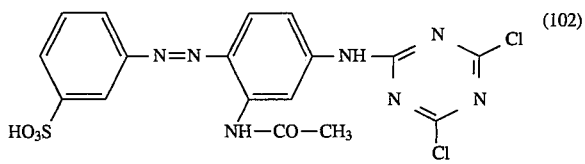

in the form of the free acid.

In a second step, 26.3 parts of 4,4'-diaminostilbene-2,2'-disulfonic acid are dissolved in 50 parts of water and the solution is added dropwise ever 10 minutes to the solution of the compound of formula (102) obtainable as described above, while keeping the pH at 4.8 by the addition of a 1N aqueous sodium hydroxide solution. When the dropwise addition is complete, the mixture is allowed to react overnight. The consumption of 1N aqueous sodium hydroxide solution is c. 100 parts. The reaction product is then salted out with 150 parts of sodium chloride and the precipitate is filtered with suction and dried in a vacuum drier, affording 97 parts of the compound of formula

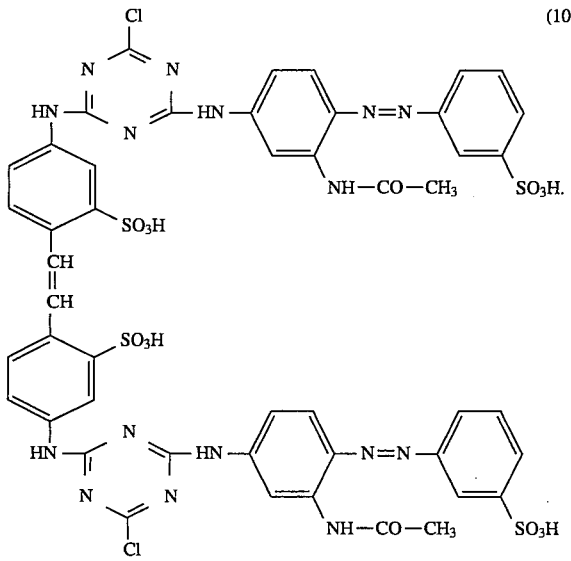

in the form of the free acid.

In a third step, 18.92 parts of the compound of formula (103) obtainable as described above are dissolved in 500 parts of water. Then 2.75 parts of 2-aminoethanol are added and the mixture is heated to a temperature of 85° C. The pH falls from initially 11.2 to 8.5. The reaction time is c. 20 hours. The reaction product is salted out with sodium chloride and the precipitate is isolated by filtration and dried, affording 18 parts of a dye in the form of the free acid of the compound of formula

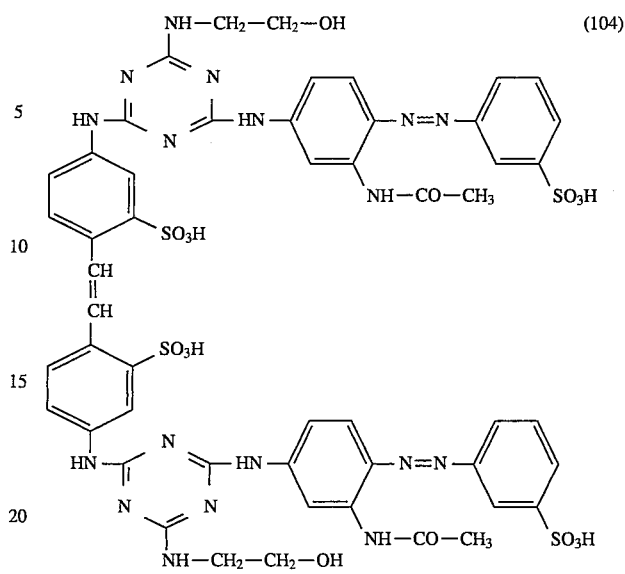

It dyes cotton in a yellow shade.

EXAMPLES 3 to 51

The procedure described in Example 2 is repeated, but using instead of 33.4 parts of the compound of formula (101) an equimolar amount of a compound of formula

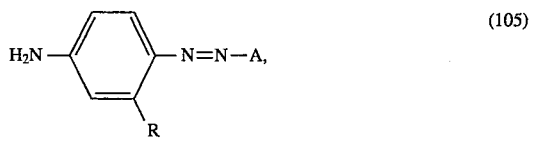

and instead of 2.75 parts of 2-aminoethanol an equimolar amount of a compound of formula

in which formulae A, R and Y have the meanings given in Table 1, to give the dyes listed in Table 1 of the general formula

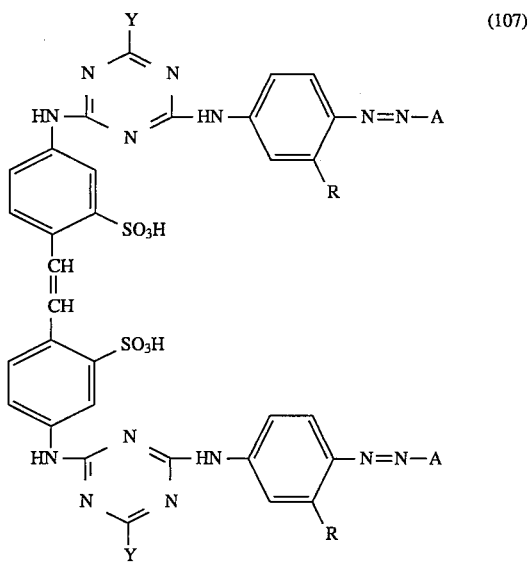

wherein A, Y and R have the meanings given in Table 1, and which dye cotton in a yellow shade.

TABLE 1

| Ex. | A | R | Y |
|---|---|---|---|
| 3 | 3-SO₃H-phenyl | —NH—CO—CH₃ | —NHCH₂CH₂OH |
| 4 | 3-SO₃H-phenyl | —NH—CO—CH₃ | —N(CH₂CH₂OH)₂ |
| 5 | 3-SO₃H-phenyl | —NH—CO—CH₃ | morpholino |
| 6 | 3-SO₃H-phenyl | —NH—CO—CH₃ | —NH-phenyl |
| 7 | 3-SO₃H-phenyl | —NH—CO—CH₂CH₃ | —NHCH₂CH₂OH |
| 8 | 3-SO₃H-phenyl | —NH—CO—CH₂CH₃ | morpholino |
| 9 | 3-SO₃H-phenyl | —NH—CO—CH₂CH₃ | —NH—CH₂—CH(OH)—CH₂—OH |
| 10 | 3-SO₃H-phenyl | —NH—CO—CH₂OH | —NHCH₂CH₂OH |
| 11 | 3-SO₃H-phenyl | —NH—CO—CH₂OH | —N(CH₂CH₂OH)₂ |
| 12 | 3-SO₃H-phenyl | —NH—CO—CH₂OH | morpholino |
| 13 | 3-SO₃H-phenyl | —NH—CO—NH₂ | morpholino |

TABLE 1-continued

| Ex. | A | R | Y |
|---|---|---|---|
| 14 | 3-SO₃H-phenyl | —NH—CO—NH₂ | —NH—cyclohexyl |
| 15 | 4-SO₃H-phenyl | —NH—CO—CH₃ | morpholino (—N(CH₂CH₂)₂O) |
| 16 | 4-SO₃H-phenyl | —NH—CO—CH₃ | —NHCH₂CH₂OH |
| 17 | 4-SO₃H-phenyl | —NH—CO—CH₃ | —N(CH₂CH₂OH)₂ |
| 18 | 2-CH₃-4-SO₃H-phenyl | —NH—CO—CH₃ | —N(CH₂CH₂OH)₂ |
| 19 | 2-CH₃-4-SO₃H-phenyl | —NH—CO—CH₃ | —NHCH₂CH₂OH |
| 20 | 2-CH₃-4-SO₃H-phenyl | —NH—CO—CH₃ | morpholino (—N(CH₂CH₂)₂O) |
| 21 | 2-CH₃-4-SO₃H-phenyl | —NH—CO—CH₂OH | morpholino (—N(CH₂CH₂)₂O) |
| 22 | 2-CH₃-4-SO₃H-phenyl | —NH—CO—CH₂OH | —NHCH₂CH₂OH |
| 23 | 2-CH₃-4-SO₃H-phenyl | —NH—CO—CH₂OH | —N(CH₂CH₂OH)₂ |
| 24 | 2-CH₃-4-SO₃H-phenyl | —NH—CO—CH₂OH | —NH—CH₂—CH(OH)—CH₂—OH |

TABLE 1-continued

| Ex. | A | R | Y |
|---|---|---|---|
| 25 | 2-CH₃, 5-SO₃H phenyl | —NH—CO—CH₂OH | —NH-phenyl |
| 26 | 2,4-di(SO₃H) phenyl | —NH—CO—CH₃ | —NH-phenyl |
| 27 | 2,4-di(SO₃H) phenyl | —NH—CO—CH₃ | —NHCH₂CH₂CH₃ |
| 28 | 2-SO₃H, 4-OCH₃ phenyl | —NH—CO—CH₃ | —N(morpholino) |
| 29 | 2-SO₃H, 4-OCH₃ phenyl | —NH—CO—CH₃ | —NHCH₂CH₂OH |
| 30 | 2-SO₃H, 4-CH₃, 5-CH₃ phenyl | —NH—CO—CH₃ | —NHCH₂CH₂OH |
| 31 | 2-SO₃H, 4-CH₃, 5-CH₃ phenyl | —NH—CO—CH₃ | —N(piperidino) |
| 32 | 2-SO₃H, 4-CH₃, 5-CH₃ phenyl | —NH—CO—CH₃ | —N(CH₂CH₂OH)₂ |
| 33 | 2-SO₃H, 4-CH₃, 5-CH₃ phenyl | —NH—CO—CH₃ | —NH—CH₂—CH(OH)—CH₂—OH |

TABLE 1-continued

| Ex. | A | R | Y |
|---|---|---|---|
| 34 | 3-methyl-5,8-disulfo-naphthalen-1-yl (SO₃H at 1, HO₃S at 5, CH₃ at... naphthalene with SO₃H and HO₃S substituents) | —NH—CO—CH₃ | —N(CH₂CH₂)₂O (morpholino) |
| 35 | (same naphthalene as above) | —NH—CO—CH₃ | —N(CH₂CH₂OH)₂ |
| 36 | (same naphthalene) | —NH—CO—CH₃ | —NHCH₂CH₂OH |
| 37 | (same naphthalene) | —CH₃ | —NHCH₂CH₂OH |
| 38 | (same naphthalene) | —CH₃ | —N(CH₂CH₂)₂O (morpholino) |
| 39 | (same naphthalene) | —CH₃ | —N(CH₂CH₂OH)₂ |
| 40 | (same naphthalene) | —CH₃ | —NH—C₆H₅ |

TABLE 1-continued

| Ex. | A | R | Y |
|---|---|---|---|
| 41 | 3-methyl-1-sulfo-5-sulfo-naphthyl (SO₃H at 1, HO₃S at 5, CH₃ at 3) | —NH—CO—NH₂ | —NH—C₆H₅ (anilino) |
| 42 | 3-methyl-1-sulfo-5-sulfo-naphthyl | —NH—CO—NH₂ | —NHCH₂CH₂OH |
| 43 | methyl-naphthyl-2,5,7-trisulfonic acid | —NH—CO—NH₂ | —NHCH₂CH₂OH |
| 44 | methyl-naphthyl-2,5,7-trisulfonic acid | —NH—CO—NH₂ | —NH—C₆H₅ |
| 45 | 4-methyl-1-sulfo-naphthyl | —NH—CO—CH₃ | —N(CH₂CH₂OH)₂ |
| 46 | 4-methyl-1-sulfo-naphthyl | —NH—CO—CH₃ | morpholino (—N(CH₂CH₂)₂O) |
| 47 | 4-methyl-6-sulfo-naphthyl | —NH—CO—CH₃ | —NHCH₂CH₂OH |

TABLE 1-continued

| Ex. | A | R | Y |
|---|---|---|---|
| 48 | naphthalene-SO₃H | $-NH-CO-CH_3$ | $-N(CH_2CH_2OH)_2$ |
| 49 | naphthalene-SO₃H | $-NH-CO-CH_3$ | morpholino (-N(CH₂CH₂)₂O) |
| 50 | naphthalene (SO₃H, SO₃H) | $-NH-CO-CH_3$ | morpholino (-N(CH₂CH₂)₂O) |
| 51 | naphthalene (SO₃H, SO₃H) | $-NH-CO-CH_3$ | $-NHCH_2CH_2OH$ |

Dyeing Instruction I 10 parts of cotton fabric (bleached and mercerised) are put at c. 30° C. into a dyebath which contains 200 parts of water and 0.35 part of the dye of Example 2. The liquor is heated over 30 minutes to 95° C. and kept for 15 minutes at this temperature. Then 4 parts of sodium sulfate are added and dyeing is carded out for a further 45 minutes at 95° C. Afterwards the dyebath is cooled to 80° C. over 15 minutes and kept for another 15 minutes at this temperature. The dyeing is then thoroughly rinsed with cold water and dried.

Dyeing Instruction 2

10 parts of a polyester/cotton blend are put at c. 50° C. into a dyebath containing 200 parts of water, a dye mixture consisting of 0.2 part of C.I. Disperse Yellow 99 and 0.2 part of the dye of Example 2, 0.4 part of ammonium sulfate and 0.2 part of an anionic dispersant (e.g. condensate of formaldehyde and naphthalenesulfonic acid). The dyebath is adjusted to pH 5.5 with formic acid and, after addition of 1 part of sodium sulfate, heated over 45 minutes to c. 130° C. Dyeing is continued for another 45 minutes at 130° C. The dyebath is then cooled to c. 80° C. over 30 minutes and kept for a further 45 minutes at this temperature. The dyeing is then thoroughly rinsed with cold water and dried.

Dyeing Instruction 3

The procedure of Dyeing Instruction 1 or 2 is repeated, except that, after termination of the dyeing procedure, the cold-rinsed dyeing is put into a fresh warm bath of 30° C. which contains 200 parts of water and 0.2–0.6 part of a cationic aftertreatment agent (amine/formaldehyde/dicyandiamide condensate or formulation based on dicyandiamide and diethylenetriamine). The dyeing is aftertreated for 30 minutes at 30° C. and then dried without a further rinsing step. A dyeing having enhanced wetfastness properties is obtained.

Dyeing Instruction 4

The procedure of Dyeing Instruction 1 or 2 is repeated, except that after termination of the dyeing procedure, the cold-rinsed dyeing is put into a fresh warm bath of c. 25° C. which contains 200 parts of water, 1 part of sodium sulfate and 0.6 part of a fibre-reactive cationic aftertreatment agent based on N-methyldialkylamine and epichlorohydrin. The temperature is raised to 40° C. over 15 minutes, then 0.8 part of a 30% sodium hydroxide solution is added and the dyeing is treated for a further 45 minutes at 40° C. The dyeing is finally rinsed hot and dried. It has enhanced wetfastness properties.

What is claimed is:

1. An azo dye of formula

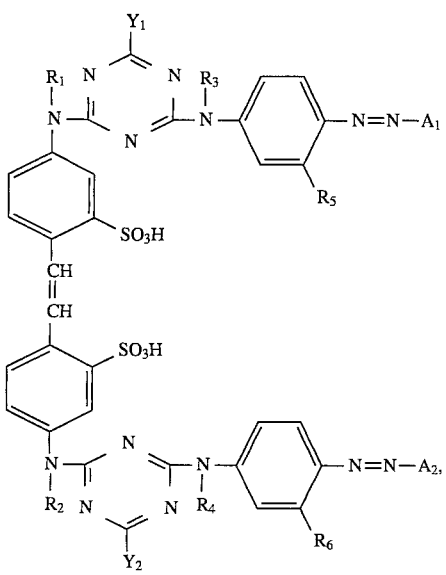

(1)

wherein $R_1$, $R_2$, $R_3$ and $R_4$ are each independently of one another hydrogen or unsubstituted or substituted $C_1$–$C_4$alkyl, $R_5$ and $R_6$ are $C_2$–$C_4$alkanoylamino, $Y_1$ and $Y_2$ are morpholino, and $A_1$ and $A_2$ are sulfo-substituted phenyl.

2. An azo dye according to claim 1, wherein $R_1$, $R_2$, $R_3$ and $R_4$ are hydrogen or $C_1$–$C_4$alkyl.

3. An azo dye according to claim 1, wherein $A_1$ and $A_2$ and $Y_1$ and $Y_2$ each have identical meanings.

4. An azo dye according to claim 1, wherein $R_5$ and $R_6$ are acetylamino.

5. An azo dye according to claim 1, wherein $R_1$, $R_2$, $R_3$ and $R_4$ are hydrogen.

* * * * *